United States Patent [19]

Walsh et al.

[11] Patent Number: 5,860,777
[45] Date of Patent: Jan. 19, 1999

[54] CARGO RESTRAINT ATTACHMENT ASSEMBLY

[75] Inventors: Martin Walsh; Brian Adkins, both of Savannah, Ga.

[73] Assignee: Great Dane Limited Partnership, Chicago, Ill.

[21] Appl. No.: 519,552

[22] Filed: Aug. 25, 1995

[51] Int. Cl.$^6$ ....................................................... B60P 7/08
[52] U.S. Cl. ........................... 410/100; 410/103; 410/104; 296/182
[58] Field of Search ................................ 410/8, 9, 10, 11, 410/12, 97, 100, 103, 104, 105, 106; 296/182, 43; 254/213, 266, 222, 223, 323, 329; 24/68 CD, 265 CD; 248/499, 503

[56] References Cited

U.S. PATENT DOCUMENTS

| | | | |
|---|---|---|---|
| 3,240,473 | 3/1966 | Coffey et al. | 410/103 |
| 3,618,999 | 11/1971 | Hlinsky et al. | 410/103 X |
| 3,697,045 | 10/1972 | Farley | 410/103 |
| 4,226,465 | 10/1980 | McCullough | 410/104 X |
| 4,367,993 | 1/1983 | Meigs | 410/103 |
| 4,382,736 | 5/1983 | Thomas | 410/104 |
| 4,732,420 | 3/1988 | O'Neil et al. | 296/43 |
| 4,900,203 | 2/1990 | Pope | 410/100 X |
| 5,351,990 | 10/1994 | Thomas . | |
| 5,388,938 | 2/1995 | Helton | 24/68 CD X |

FOREIGN PATENT DOCUMENTS

| 2247656 | 3/1992 | United Kingdom | 410/103 |
|---|---|---|---|

OTHER PUBLICATIONS

Great Dane Trailers; "Platform Trailer Quality Features" brochure; Jun., 1989; Savannah, Georgia (4 pages).
Great Dane Trailers; "Aluminum/Steel Composite Platform Trailers" brochure; Jul., 1993; Savannah, Georgia (2 pages).
Great Dane Trailers; "Multi–Purpose Platform Trailers" brochure; Jul., 1993; Savannah, Georgia (2 pages).
Kinedyne Corporation Cargo Control brochure; Nov. 19, 1987 (1 page).
Flatbed Tiedown Accessories brochure; Nov. 19, 1987 (1 page).
Buyers Guide 1994; pp. 354–355, 358; 1994 (3 pages).

*Primary Examiner*—Stephen Gordon
*Attorney, Agent, or Firm*—Dority & Manning, P.A.

[57] ABSTRACT

An improved cargo restraint attachment assembly for use with a platform trailer includes a body having an interior side and an exterior side opposite thereto. A first section is adjacent to the interior side and configured to attach the body to a loading deck of the platform trailer so that the body extends outwardly from and along at least a portion of a longitudinal edge of the loading deck. A second section is configured to selectively secure the cargo restraint device at a desired position with respect to the longitudinal edge. The assembly may secure at least one cargo restraint device at an angle with respect to a horizontal plane to minimize bending moment on the cargo restraint device from force applied thereto by engagement with a load on a loading deck of the platform trailer.

6 Claims, 3 Drawing Sheets

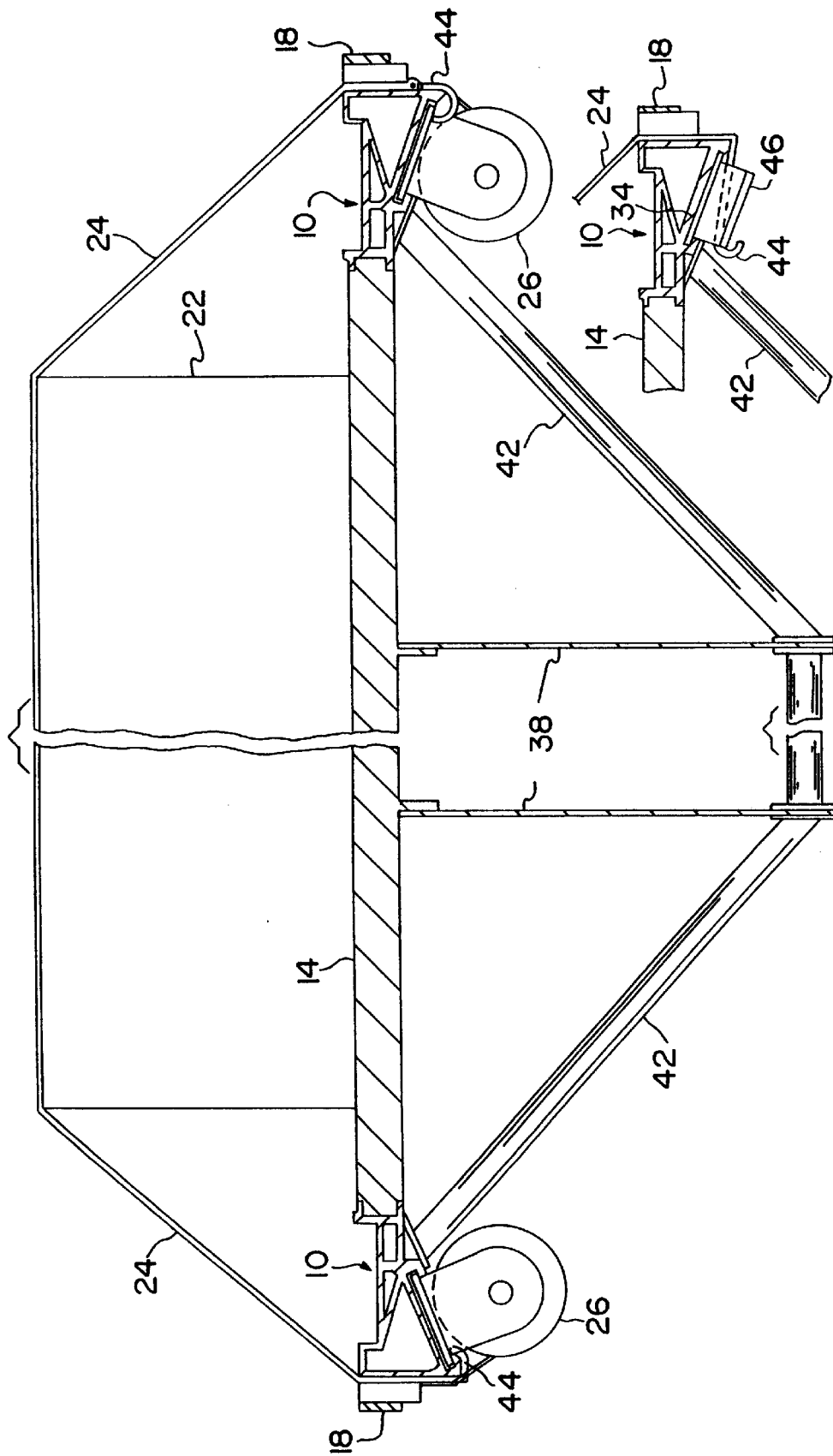

CARGO RESTRAINT ATTACHMENT ASSEMBLY

BACKGROUND OF THE INVENTION

The present invention relates to a cargo restraint attachment assembly for use with a platform trailer.

A platform or flatbed trailer typically includes a flat loading deck without permanent sides or roof and a trailer chassis having a load carrying main frame. Various means are known for restraining cargo on a platform trailer, for example including straps, chains or cables employing load binders or winches. A winch, for example, may be attached in a stationary position so that its strap may extend around the side rail over the cargo to attach to the opposite side rail or to a notch, ring or other attachment device thereabout.

Additionally, some platform trailer configurations include a track mechanically attached at the underside of the trailer to cross members extending laterally below the loading deck. The track is configured to slidably receive winches to be positioned at desired locations along the track with respect to the loading deck. Such construction permits the selective positioning of winches in response to the needs of individual cargo loads.

Because winch tracks are typically attached on the underside of a platform trailer, the winches secured thereto extend below and down from the loading deck. To avoid interference with the trailer wheels, winch tracks typically extend along only a portion of either platform trailer side. Winches near the wheels are installed in fixed non-interfering positions. Alternatively, "low-profile" winches may be used in tracks above the wheels to avoid such interference. Such winches are, however, typically incapable of storing the winch strap because of their size and configuration.

As will be understood by those of ordinary skill in the art, a loaded strap extending from the winch and around the side rail creates a bending moment on a winch secured in a winch track. The winch tracks must be constructed to adequately support and secure the winches when such bending moment is applied as a result of cargo loading.

Based on the foregoing, it can be seen that a need exists for a cargo restraint attachment assembly that permits the selective positioning of cargo restraint devices at any desired position relative to a longitudinal edge of a platform trailer and for a construction that reduces bending moment on a cargo restraint attachment assembly.

SUMMARY OF THE INVENTION

The present invention recognizes and addresses various of the foregoing disadvantages, and others of prior art construction and methods.

Accordingly, it is an object of the present invention to provide an improved cargo restraint attachment assembly for use with a platform trailer.

It is another object of the present invention to provide an improved trailer side rail.

Yet another object of the present invention is to provide a cargo restraint attachment assembly that minimizes weight added to the trailer and simplifies assembly.

Some of these objects are achieved by a cargo restraint attachment assembly for use with a platform trailer having a loading deck. The assembly comprises a track disposed outwardly from and along at least a portion of a longitudinal edge of the loading deck and configured to slidably receive at least one winch to selectively position the winch with respect to the longitudinal edge. Such construction reduces interference between a winch and the platform trailer wheels when the winch is positioned thereabout. The winch is configured to secure cargo to a loading deck of the platform trailer.

In a preferred embodiment, the assembly comprises a side rail assembly attached to a longitudinal edge of the loading deck and extending laterally therefrom. In this embodiment, a body comprises a truss structure having an interior side and an opposing exterior side. The interior side is adjacent to a section for attaching the body to the loading deck. The body also defines a winch track for slidably receiving winches therein. The body, section, and winch track are preferably of a unitary extruded construction.

The winch track is disposed so that the winches extend below the plane of the loading deck. A rub rail extends generally parallel to the exterior side and is connected thereto by a plurality of stake pockets. Thus, in operation, the winch strap extends from the winch, around the side rail within the rub rail, and over the cargo on the loading deck to an attachment means on the opposite side of a loading deck.

When loaded, the winch strap exerts a force on the winch, creating a bending moment. To reduce the bending moment, the winch track is disposed at an angle below the horizontal plane and toward the platform trailer chassis. Such arrangement permits a lighter winch track construction than is generally available. It also decreases the vertical profile of the winch assembly. This arrangement, and/or the positioning of the winches laterally beyond the loading deck edge, permit the installation of the winch track over platform trailer tires and tractor tires. In addition, the unitary construction eliminates the need to bolt or weld the winch track to the trailer chassis.

In another presently preferred embodiment, a cargo restraint attachment assembly for use with a platform trailer is provided that includes a body configured to attach to the loading deck or chassis and to secure at least one cargo restraint device at an angle with respect to a horizontal plane. This configuration minimizes bending moment on the assembly from force applied thereto by engagement with a load on a loading deck of the platform trailer.

In yet another presently preferred embodiment, a platform trailer comprises a load carrying main frame, a loading deck supported by the mainframe, a plurality of wheels attached to the main frame to permit transport of the trailer and a cargo restraint attachment assembly. The cargo restraint attachment assembly includes a body configured to be attached to the loading deck and defining a track disposed outwardly from and along at least a portion of a longitudinal edge of the loading deck. The track is configured to slidably receive at least one winch to be selectively positioned with respect to the longitudinal edge, thereby reducing interference between the winch and the wheels when the cargo restraint device is positioned thereabout. The winch is configured to secure cargo to the loading deck.

It will be understood by those of ordinary skill in the art that the present invention may employ various cargo restraint devices. In fact, devices other than winches may be preferable in some applications. It should be understood that various equivalent embodiments of the present invention may be configured to employ such suitable restraint devices and that all such embodiments are included within the scope and spirit of the present invention. Furthermore, the cargo restraint attachment assembly of one presently preferred embodiment is constructed from extruded aluminum alloy. It should be understood, however, that various other suitable materials and construction methods could be utilized.

The accompanying drawings, which are incorporated in and constitute a part of this specification, illustrate one embodiment of the invention and, together with the description, serve to explain the principles of the invention.

BRIEF DESCRIPTION OF THE DRAWINGS

A full and enabling disclosure of the present invention, including the best mode thereof, directed to one of ordinary skill, is set forth in the specification, which makes reference to the appended drawings, in which:

FIG. 4 is a partial cross sectional view of the platform trailer as in FIG. 1; and FIG. 4A is a cross sectional view of a cargo restraint attachment assembly constructed in accordance with the present invention including a winch strap attachment device.

Figures 1, 2:
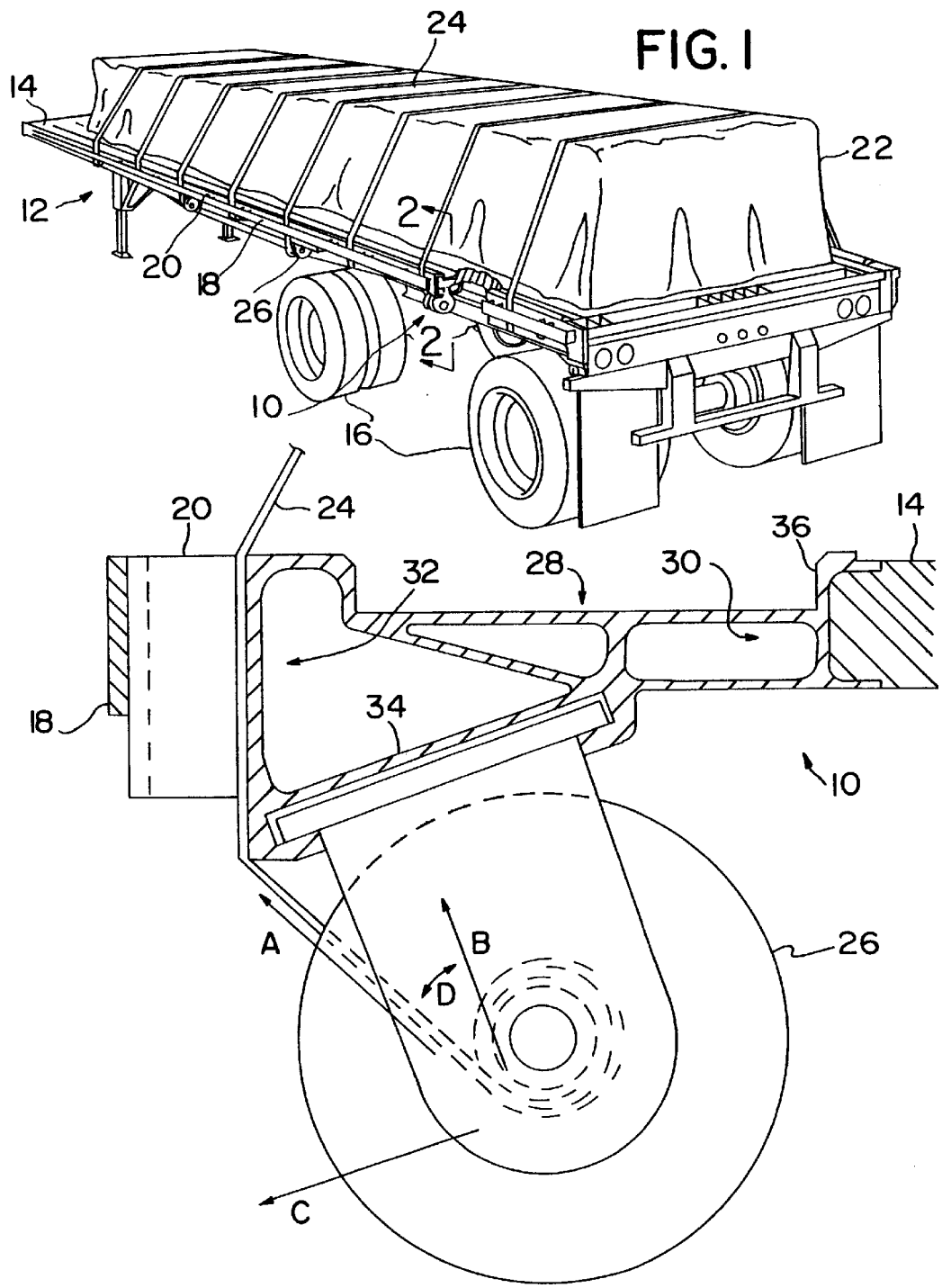
FIG. 1 is a perspective view of a platform trailer constructed in accordance of the present invention.
FIG. 2 is a cross sectional view of a cargo restraint attachment assembly constructed in accordance with the present invention having a winch device secured thereby.

Repeat use of reference characters in the present specification and drawings is intended to represent same or analogous features or elements of the invention.

DETAILED DESCRIPTION OF THE PREFERRED EMBODIMENTS

Reference will now be made in detail to the presently preferred embodiments of the invention, one or more examples of which are illustrated in the accompanying drawings. Each example is provided by way of explanation of the present invention, not limitation of the invention. In fact, it will be apparent to those skilled in the art that variations can be made in the present invention without departing from the scope or spirit thereof. For instance, features illustrated or described as part of one embodiment may be used on another embodiment to yield a still further embodiment. Thus, it is intended that the present invention cover such modifications and variations as come within the scope of the appended claims and their equivalents.

The present invention is concerned with an improved cargo restraint attachment assembly for a platform trailer. Accordingly, FIG. 1 depicts a presently preferred embodiment of the cargo restraint attachment assembly, shown generally at 10, in conjunction with a platform trailer 12. Trailer 12 includes in general a flat loading deck 14, wheels 16, and a load carrying main frame. Cargo restraint attachment assembly 10 comprises a side rail assembly having a rub rail 18 disposed generally parallel to the exterior side of the assembly 10. Rub rail 18 is secured to cargo restraint attachment assembly 10 by a plurality of stake pockets 20. As should be understood by those of ordinary skill in the art, stake pockets 20 may receive stakes or other restraining devices to maintain cargo on the loading deck.

In the embodiment depicted in FIG. 1, cargo 22 is secured on loading deck 14 by a plurality of winch straps 24. Winch straps 24 are received on winches 26 as should be apparent to one skilled in the art. A side rail assembly and associated winches 26 are provided on each side of platform trailer 12. Thus, as shown in FIG. 1, straps 24 may extend from either side of the trailer to attach to the opposite side rail or other securing location.

FIG. 2 illustrates a cross sectional view of cargo restraint assembly 10 attached to loading deck 14. The assembly is configured as a side rail which is attached to loading deck 14 and attached to or integral with rub rail 18 by stake pockets 20. Assembly 10 includes a body 28, an interior side 30, and an exterior side 32. Body 28 forms a truss structure defining winch track 34. Interior side 30 is attached to loading deck 14 through section 36. Section 36, body 28, interior side 30, exterior side 32, and winch track 34 are preferably extruded in a unitary construction. In a preferred embodiment, they may be constructed of an aluminum alloy, but as set forth above any suitable material could be utilized.

Winch track 34 slidably receives winch 26 therein. As shown in FIG. 2, winch 26 includes a base member having a first end received by track 34. The base member extends from its first end downward from the track, and at an oblique angle with respect to the loading deck, to a second end at which winch strap 24 is windingly received, as is shown in the figure. Winch strap 24 extends from winch 26 around the side rail and, when loaded, exerts a force A on winch 26. Force A may be resolved into compression force B and bending force C. As is apparent from FIG. 2, compression force B is exerted along an axis of the base member between the first end and the second end. In general, bending force C is responsible for the bending moment on cargo restraint assembly 10. The magnitude of bending force C is determined by angle D. Reducing angle D reduces the bending moment. Accordingly, winch track 34 is disposed at an angle below a horizontal plane including loading deck 14, thereby minimizing angle D. In one preferred embodiment, winch track 34 is disposed such that angle D equals approximately 29 degrees. Applicants have found that such a configuration may reduce bending moment on a loaded winch by 30% to 40%. As should be understood by those in ordinary skill of the art, the reduced bending moment enables a generally lighter construction of assembly 10.

The angled winch track construction also reduces the vertical profile of the winches 26 secured by assembly 10, thereby reducing possible interference with wheels 16 (FIG. 1). Such interference is also reduced by the extension of winch track 34, and consequently winch 26, beyond the lateral edge of loading deck 14. Accordingly, assembly 10, including winch track 34, may extend along the entire length of loading deck 14.

Figure 3:
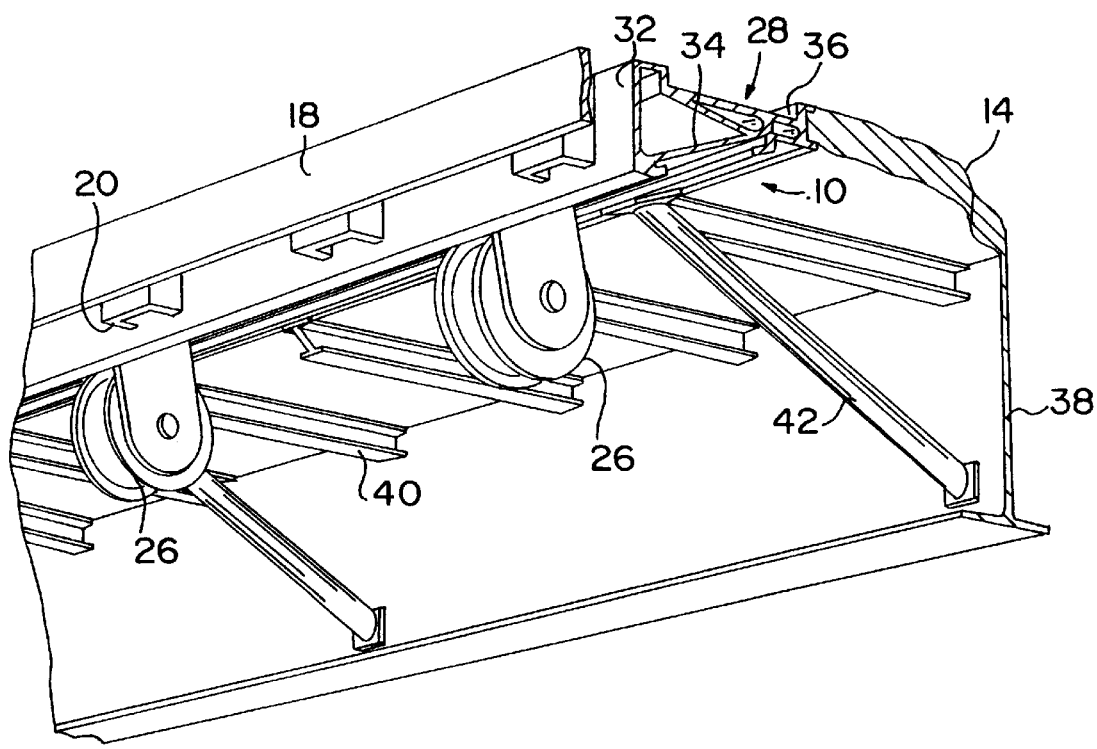
FIG. 3 is a partial perspective view of a platform trailer as in FIG. 1.

FIG. 3 illustrates a partial side perspective view of the underside of trailer 12. Loading deck 14 and assembly 10 are supported by a load carrying mainframe including two main beams 38 (FIG. 4), cross members 40 and sway bars 42. FIG. 3 illustrates a plurality of winches 26. Winches 26 are slidably received in winch track 34 and may be positioned in any desired position along winch track 34.

Referring now to FIG. 4, a partial cross sectional view of the platform trailer in FIG. 1 as illustrated. In particular, two assemblies 10 are attached to either side of loading deck 14. Winch straps 24 extend from winches 26 on either side of loading deck 14 around respective side rails, over load 22 to attach to opposing side rails by hooks 44. While hooks 44 are illustrated for securing to the side rails, it should be apparent that the winch straps could be attached to winches on the opposing side or by any other suitable means. For example, FIG. 4A illustrates a hook 44 secured to an attachment device 46 that is slidably received by winch track 34.

As is apparent from the above, the present invention provides significant improvements to existing cargo restraint attachment assemblies from a functional as well as manufacturing standpoint.

While one preferred embodiment of the invention has been described above, it should be understood that any and all equivalent realizations of the present invention are included within the scope and spirit thereof. For example, the cargo restraint attachment assembly need not be constructed within a side rail assembly. It may be, for example, attached by various means by the main load carrying frame. Similarly, various suitable mechanisms and means may be employed to attach the assembly to the trailer, including clips, bolts, rivets, screws, and the like. Also, various suitable constructions of the cargo restraint attachment assembly may be achieved, including, for example, alternate brace structures. Additionally, the cargo restraint device may be disposed at various angles with respect to the trailer according to trailer configuration and/or cargo requirements. Furthermore, various equivalent cargo restraint devices, and mechanisms to attach such devices to the assembly, are included within the scope and spirit of the present invention and should be understood by those of ordinary skill in the art.

Thus, the embodiment depicted is presented by way of example only and is not intended as a limitation upon the present invention. Thus, while particular embodiments of the invention have been described and shown it will be understood by those of ordinary skill in this art that the present invention is not limited thereto since many modifications can be made. Therefore, it is contemplated that any and all such embodiments are included in the present invention as may fall within the literal or equivalent scope of the appended claims.

What is claimed is:

1. A platform trailer, said platform trailer comprising:
   a load carrying main frame;
   a loading deck, supported by said main frame, which defines a horizontal plane and upon which cargo may be loaded, said loading deck including a side rail extending laterally outward from a longitudinal edge of said loading deck;
   a plurality of wheels attached to said main frame to permit transport of the trailer; and
   a cargo restraint device attachment assembly attached to said side rail, said cargo restraint device attachment assembly configured to secure a base of at least one cargo restraint device so that said base extends below and at an oblique angle with respect to said horizontal plane and so that a flexible member of said cargo restraint device is extendable above said plane from said base below said plane to secure said cargo loaded on said loading deck, wherein said cargo restraint device attachment assembly includes
      at least one flange extending from said side rail below said horizontal plane and along substantially the entire length of said side rail to slidably receive said base,
      a substantially planar central portion extending longitudinally along and under said side rail at an oblique angle with respect to said horizontal plane, and
      a pair of said flanges, one said flange extending from each longitudinal edge of said planar central portion and each said flange having a first portion extending from its respective said central portion edge substantially perpendicularly to said planar central portion and having a second portion extending from said first portion substantially parallel to said planar central portion and toward the other said flange, thereby defining a channel to receive said base, wherein said flanges extend below said horizontal plane and inward toward the center of the trailer.

2. A platform trailer, said platform trailer comprising:
   a load carrying main frame;
   a loading deck, supported by said main frame, which defines a horizontal plane and upon which cargo may be loaded;
   a plurality of wheels attached to said main frame to permit transport of the trailer; and
   a cargo restraint device attachment assembly attached to one of said loading deck and said main frame, said cargo restraint device attachment assembly including a track configured to slidably receive a base of each of a plurality of cargo restraint devices so that each said base extends below and at an oblique angle with respect to said horizontal plane and so that a flexible member of each said cargo restraint device is extendable above said plane from said base below said plane to secure said cargo loaded on said loading deck, said track including
   a substantially planar central portion attached to said one of said loading deck and said main frame at an oblique angle with respect to said horizontal plane, and
   a pair of flanges, one said flange extending from each longitudinal edge of said planar central portion and each said flange having a first portion extending from its respective said central portion edge substantially perpendicularly to said planar central portion and having a second portion extending from said first portion substantially parallel to said planar central portion and toward the other said flange, thereby defining a channel to receive said base, wherein said flanges extend below said horizontal plane and inward toward the center of the trailer.

3. A platform trailer, said platform trailer comprising:
   a load carrying main frame;
   a loading deck, supported by said main frame, which defines a horizontal plane and upon which cargo may be loaded;
   a plurality of wheels attached to said main frame to permit transport of the trailer; and
   a side rail including a body portion having an interior side and an exterior side opposite said interior side, said interior side attached to a longitudinal edge of said loading deck so that said exterior side extends laterally outward from said loading deck edge,
   wherein said body portion includes a track configured to slidably receive a plurality of cargo restraint devices substantially between said interior side and said exterior side so that a base of each said cargo restraint device extends from said track below, and at an oblique angle with respect to, said horizontal plane and inward toward the center of said trailer and so that a flexible member of each said cargo restraint device is extendable above said plane from said base below said plane to secure said cargo loaded on said loading deck, wherein said track includes
   a substantially planar central portion extending longitudinally along an underside of said side rail at an oblique angle with respect to said horizontal plane, and
   a pair of flanges, one said flange extending from each longitudinal edge of said planar central portion and each said flange having a first portion extending from its respective said central portion edge substantially perpendicularly to said planar central portion and having a second portion extending from said first portion substantially parallel to said planar central portion and toward the other said flange, thereby defining a channel to receive said bases, wherein said flanges extend below said horizontal plane and inward toward the center of the trailer.

4. A platform trailer, said platform trailer comprising:

a load carrying main frame;

a loading deck, supported by said main frame, which defines a horizontal plane and upon which cargo may be loaded;

a plurality of wheels attached to said main frame to permit transport of the trailer; and a side rail including
- a body portion having an interior side and an exterior side opposite said interior side, said interior side attached to a longitudinal edge of said loading deck so that said exterior side extends laterally outward from said loading deck edge, and
- a track having a substantially planar central portion attached to said side rail at an oblique angle with respect to said horizontal plane and a pair of flanges, one said flange extending from each longitudinal edge of said planar central portion and each said flange having a first portion extending from its respective said central portion edge substantially perpendicularly to said planar central portion and having a second portion extending from said first portion substantially parallel to said planar central portion and toward the other said flange, thereby defining a channel to receive a base of at least one cargo restraint device so that said base extends below, and inward toward the center of the trailer at an oblique angle with respect to, said horizontal plane and so that a flexible member of said cargo restraint device is extendable above said plane from said base below said plane to secure said cargo loaded on said loading deck, wherein said flanges extend below said horizontal plane and inward toward the center of the trailer.

5. The platform trailer as in claim 4, including a rub rail extending laterally outward from said exterior side of said side rail.

6. The platform trailer as in claim 4, wherein said side rail is of a unitary, extruded construction.

\* \* \* \* \*